Nov. 9, 1948.   C. S. REED ET AL   2,453,458
CATALYST TRANSFER SYSTEM
Filed Nov. 24, 1943   2 Sheets-Sheet 1
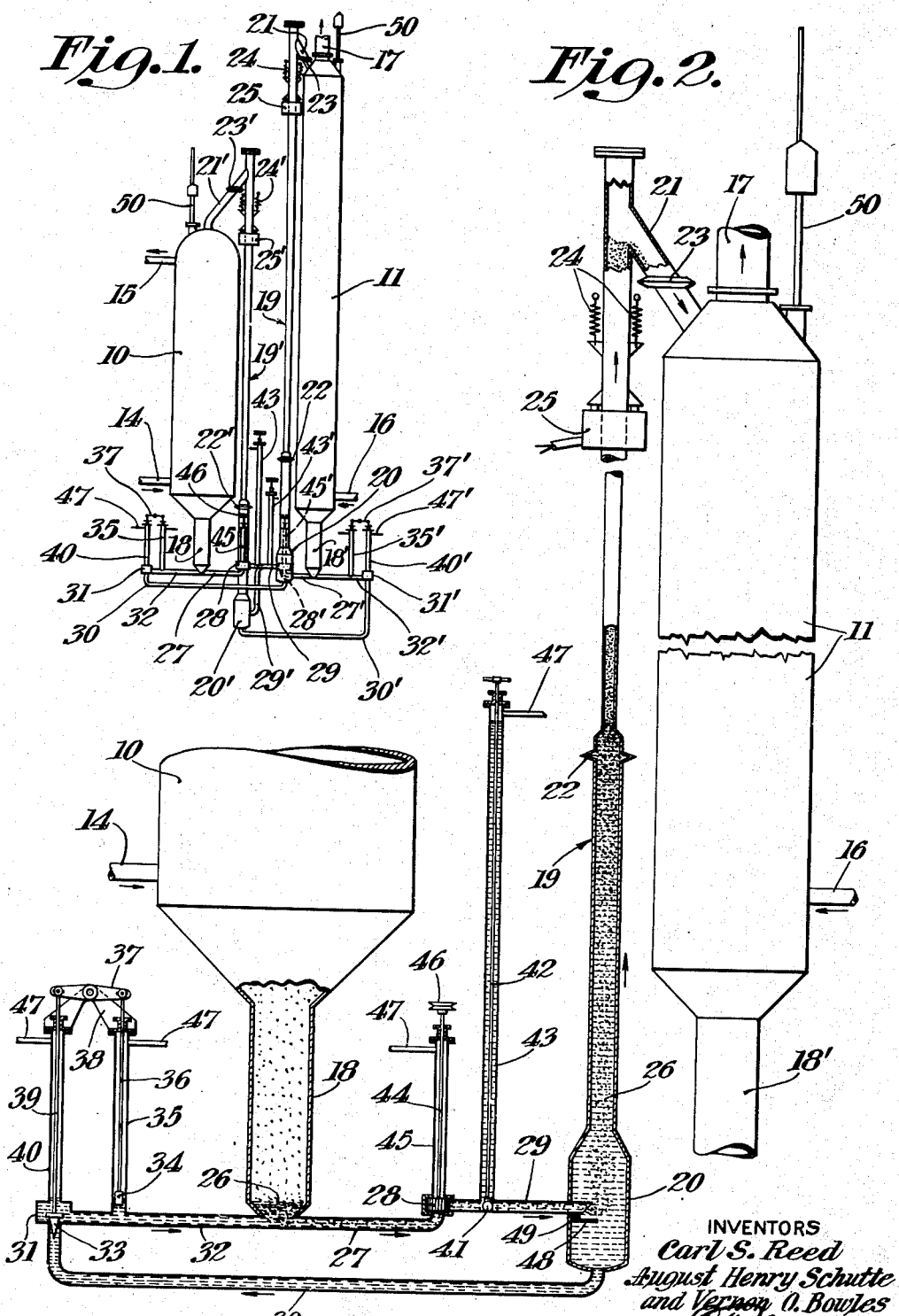
INVENTORS
Carl S. Reed
August Henry Schutte
and Vernon O. Bowles
BY
ATTORNEY

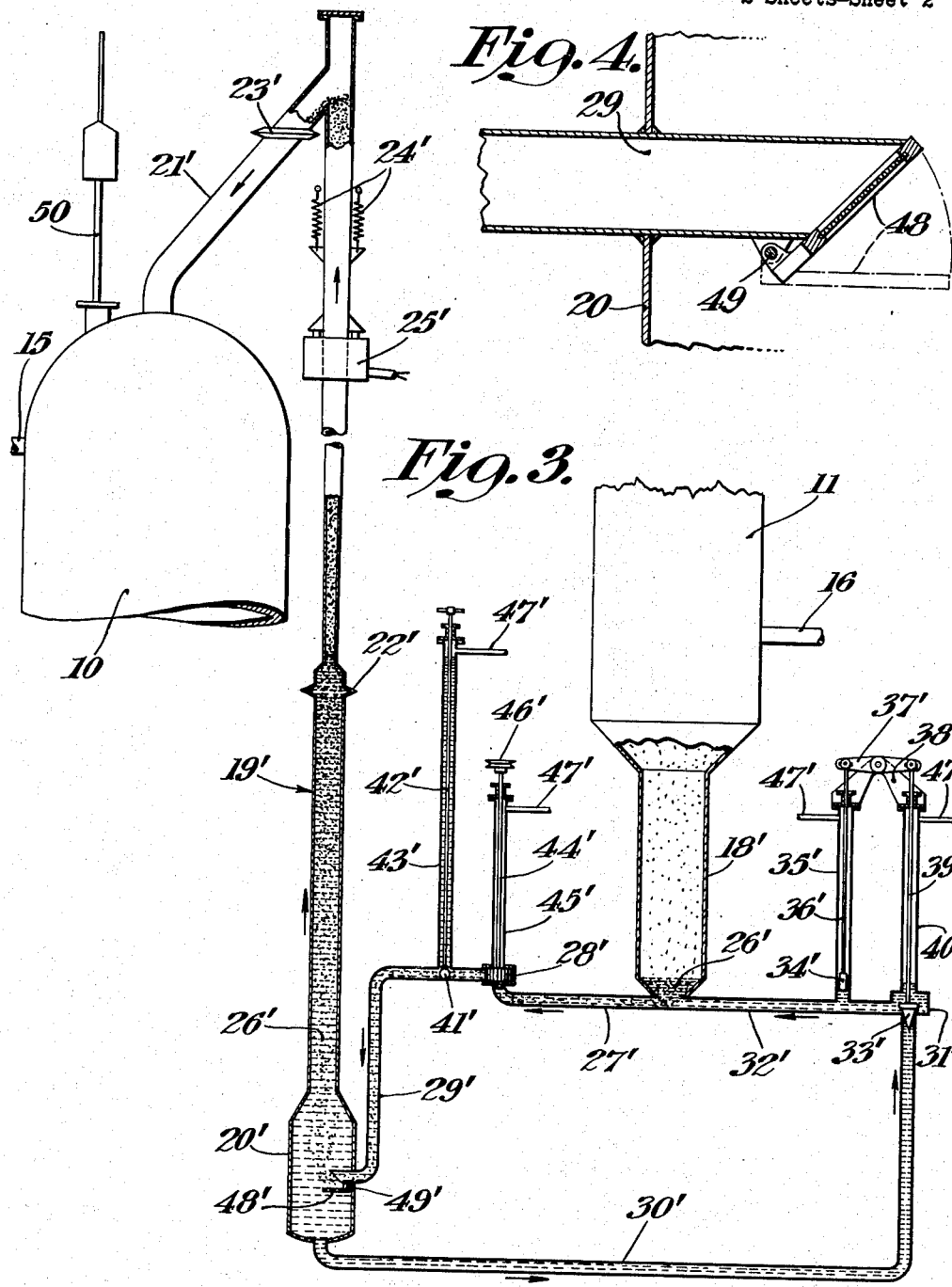

Patented Nov. 9, 1948

2,453,458

UNITED STATES PATENT OFFICE 2,453,458

CATALYST TRANSFER SYSTEM

Carl S. Reed, New York, August Henry Schutte, Hastings-on-Hudson, and Vernon O. Bowles, Dobbs Ferry, N. Y., assignors to The Lummus Company, New York, N. Y., a corporation of Delaware Application November 24, 1943, Serial No. 511,558

14 Claims. (Cl. 23—1)

This invention relates to the transfer of solid material in a divided state between zones which are required to be maintained under different gaseous conditions. More particularly, the invention relates to the transfer of a solid catalyst in a divided state between a reaction zone and a catalyst reactivation zone, with maintenance of a required pressure differential or other difference in gaseous conditions between such zones.

The present application comprehends improvements in a catalytic reaction system disclosed in a copending U. S. patent application of August Henry Schutte, Serial No. 394,823, filed May 23, 1941, and entitled, "Catalysis." The said copending application has matured into Patent No. 2,357,694 which issued September 5, 1944.

In certain continuous catalytic reaction processes a solid catalyst in a divided or granular state is passed in a continuous stream downwardly through a vertically elongated reaction zone, countercurrent to a rising stream of gaseous reactants within the zone and then the catalyst, contaminated by the reaction, is withdrawn from the reaction zone at a low point of the latter, conveyed upwardly, and delivered to a high point of a vertically elongated reactivation zone. The catalyst is next passed downwardly through the reactivation zone countercurrent to a hot gaseous stream, for removal of contaminating deposit from the catalyst. The reactivated catalyst is then conveyed upwardly from a low point of the reactivation zone and returned to a high point of the reaction zone for re-use therein. In such transfers of the catalyst between the zones mechanical conveyors are usually employed and seals are provided to prevent leakage and exchange of gas between the zones. Such conveyors and seals are complicated and expensive to manufacture and erect. They are also quite bulky and they objectionably increase the over-all height of the plant.

In a prior application of August Henry Schutte, S. N. 408,296, filed August 26, 1941, and entitled "Catalysis," and which matured into U. S. Letters Patent No. 2,331,938, granted October 19, 1943, there is disclosed provision for employment of bodies of liquid to form seals and prevent leakage and exchange of gas between the zones. The liquid there proposed for such purpose is non-wetting and non-reactive with respect to the catalyst and heavier than the catalyst.

An important object of the present invention is to provide for utilization, in a contact process, of a liquid seal of the character disclosed in the aforesaid application to effect elevation and transfer of a divided solid contact material such as a catalyst, for example, between zones which are required to be maintained under different gaseous conditions.

Another object of the invention is to provide for utilization, in a contact process, of such a liquid seal to effect elevation and transfer of a divided solid contact material between two zones by progressive flotation of the contact material from one of the zones within a column of the sealing liquid, accumulation upon the liquid column of a floating column of the contact material reaching to a high level, and passage of the contact material from the upper end of the column thereof to the other zone.

Another object of the invention is to provide a comparatively simple, compact and inexpensive means for elevating and transferring divided solid contact material between zones of a contact process system and preventing leakage and exchange of gas between the zones.

Other objects of the invention will appear hereinafter.

In the drawings,

Fig. 1 is a diagrammatic elevation of a catalytic reaction system embodying the invention;

Fig. 2 is a diagrammatic view, partly in elevation and partly in section, upon a larger scale than Fig. 1, and showing the catalyst reactivation chamber, a portion of the reaction chamber and the sealing and transferring means for passing the catalyst from the reaction chamber to the reactivation chamber;

Fig. 3 is a view similar to Fig. 2 and showing portions of the reaction and reactivation chambers and the sealing and transferring means for returning the catalyst from the reactivation chamber to the reaction chamber; and Fig. 4 is an enlarged detail vertical sectional view showing a check valve forming part of the sealing and catalyst transferring means.

The invention is shown as embodied in a catalytic reaction system for conversion of petroleum. As shown, this system includes a vertically elongated chamber 10 defining a reaction zone, and a vertically elongated chamber 11 defining a catalyst reactivation zone. Chamber 10 is cylindrical throughout most of its vertical length and chamber 11 may be cylindrical or it may be square in cross-section. The cylindrical body of the reaction chamber may be approximately sixty feet in height and its external diameter may be approximately sixteen feet. The body of the reactivation chamber may be of a height in excess of one hundred feet and its external diameter may be approximately ten feet. Of course, these dimensions may be varied; they are given merely as examples to indicate the probable magnitude of the chambers. In the present instance chamber 10 is dome-shaped at its upper end and conical at its lower end, and chamber 11 is conical at both ends. These shapes may be varied, however. A line 14 serves to conduct the reactants in vapor phase to chamber 10 at a low point of the latter, and a line 15 serves to conduct gaseous reaction products from the upper portion of the chamber. A line 16 serves to conduct a suitable heated reactivating gas to the lower portion of chamber 11, and an exhaust line 17 serves to conduct gaseous products of combustion from the upper end of chamber 11.

Means are provided for continuously transferring contaminated catalyst from the lower end of the reaction chamber 10 to the upper end of the reactivation chamber 11 and for sealing the chambers against leakage and exchange of gas therebetween. Chamber 10 has a cylindrical extension 18 of reduced diameter leading vertically downwardly from the lower end thereof and tapered at its lower end. A vertical conduit 19 extends along the height of the chambers from a level spaced below the lower end of the chamber extension 10 to a level spaced above the upper end of chamber 11. This conduit is closed at its upper and lower ends and its lower end portion is enlarged to form a separating drum 20 whose purpose will be explained hereinafter. From the drum upwardly, the conduit is cylindrical along a substantial portion of its height. At the upper end of said cylindrical portion the diameter of the conduit is materially reduced and, from the point of reduction, the conduit is gradually flared upwardly to its upper end. An inclined discharge conduit 21 leads downwardly from the upper end portion of the conduit 19 to the upper end of the reactivation chamber 11.

The said cylindrical portion of the conduit 19 is provided, near its upper end, with an expansion joint 22, and the discharge conduit 21 is provided with an expansion joint 23. Suspension springs 24 have their lower ends anchored to the tapered portion of conduit 19 and their upper ends anchored at fixed points to a suitable support, not shown. These springs and the said expansion joints floatably support the tapered portion of the conduit 19. A vibrator device 25 is associated with said floating portion of the conduit to reciprocate it vertically, for a purpose which will appear hereinafter. An electrical vibrator is indicated but one of any other suitable type may be employed if desired.

A body of sealing liquid 26 is contained within a well formed by the chamber extension 18, the conduit 19 and connected piping for circulating the liquid between said well and the conduit. The sealing liquid should have certain characteristics and should be chosen with regard to the particular operating conditions and the particular reaction. It should have a melting point sufficiently below and a boiling point sufficiently above the reaction temperatures, so that slight temperature variations within the reaction chamber will not alter its physical state. The liquid should also have a specific gravity exceeding that of the catalyst and it should be non-wetting and non-reactive with respect to the catalyst. It is also desirable that gases dissolve in the liquid to a negligible extent.

Certain metals have been found especially suitable as the liquid sealing agent since most catalytic reactions must be carried out at elevated temperatures. Metals such as lead having a high specific gravity and a relatively low melting point are especially useful when the reaction requires a pressure substantially in excess of atmospheric. Molten lead is also most satisfactory for use with bauxite and similar clay-like catalysts often used in hydrocarbon reactions. Its specific gravity is such that great heights of liquid are not required to withstand operating pressures below 100 pounds per square inch gauge. Furthermore, it does not wet the catalyst, react chemically therewith, nor materially vaporize at reaction temperatures in the range of 800°–1,000° F. Under such conditions the catalytic dehydrogenation, desulfurization, conversion, or the like of petroleum hydrocarbons may be successfully carried out. Molten alloys may be used, and also normally liquid materials such as mercury, for example.

For circulation of the sealing liquid between the well at the bottom of the reaction chamber 10 and the conduit 19 there is a horizontal pipe 27 leading from said well to the inlet of a pump 28. This pump is preferably of the rotary impeller type. A horizontal delivery pipe 29 leads from the pump outlet to the separating drum 20 forming the lower end of the conduit 19. From the bottom of the separating drum a horizontal liquid return pipe 30 leads to a valve casing 31, and from the latter a horizontal pipe 32 leads to the said well. Within the casing 31 there is a vertically operable needle valve 33 to control flow of the liquid between the pipes 30 and 32. For automatic operation of said valve there is a float 34 located within a vertical tube 35 leading upwardly from pipe 32 for a substantial distance. Said float has a stem 36 extending upwardly through tube 35 and through a stuffing box at the upper end of the latter. At its upper end the float stem has a pin-and-slot connection with one end of a lever 37 fulcrumed intermediate its ends upon a fixed support 38. Valve 33 has a stem 39 extending upwardly through a tube 40 which extends upwardly from the valve casing 31. The valve stem extends through a stuffing box at the upper end of tube 40 and has a pin-and-slot connection with the opposite end of said lever. Thereby, through movement of the float, the valve is operated to control return flow of the liquid from the drum 20 to the said well.

Within delivery pipe 29 there is a valve 41 to control delivery of the liquid to the drum 20. Said valve has an operating stem 42 extending upwardly through a tall vertical tube 43. This tube leads upwardly from the pipe 29 and has, at its upper end, a stuffing box through which the valve stem extends. The stem has a handle for manual operation of the valve. The pump 28 from which the pipe 29 delivers is operated by a vertical shaft 44 and the latter extends through a vertical tube 45 leading upwardly from the pump casing. The shaft extends through a stuffing box at the upper end of tube 45 and has a driving pulley 46 affixed to it for operating the pump by a motor, not shown.

The purpose of the vertical tube 43 enclosing the stem of valve 41 is to permit the liquid to rise in the tube 43 to the same level as that of a column of the liquid of maximum height within the conduit 19 and thereby prevent the liquid from reaching the stuffing box through which the valve stem projects. Thereby, packing of the valve stem against the molten metal is avoided. Packing of the valve stem 39, the float stem 36 and the motor shaft 44 against the molten metal is avoided by the provision of the tubes 46, 35 and 45 respectively. These tubes are designed to space their stuffing boxes well above an equalization level reached by the liquid when the pump 28 ceases to operate. In order to prevent oxidation of the molten metal, air is excluded from all of said vertical tubes by admission of steam through pipes 47 to the tubes at points just below the stuffing boxes thereof.

The delivery pipe 29 projects into the drum 20 and a leaf check valve 48 is provided for the delivery end of the pump. This check valve is hinged within the drum, as at 49, to swing downwardly to open position and to swing upwardly to an oblique closed position. The valve is floatable by the heavy liquid within the drum to closed position when the pump ceases to operate. Preferably the check valve comprises a framed screen as shown in Fig. 4.

A sealing and catalyst transferring system similar to the system just described is employed to return the catalyst from the reactivation chamber to the reaction chamber and prevent leakage and exchange of gas between the chambers. In the illustration of the return system, parts thereof similar to the first-described system are designated by corresponding reference characters, primed to differentiate the systems. In the return system the conduit 19 and the pipes 29' and 30' extend a substantial distance below the liquid bath 26' at the lower end of the chamber extension 18'. A much higher pressure is required within the reaction chamber than within the reactivation chamber and said depression of the conduit and its connected piping constrains the liquid therein to form a head for balancing the pressure differential between the chambers.

The catalyst employed is a solid material in a divided state, preferably granular. However, it may be in pellet or small spherical form. Suitable catalysts to employ are, for examples, activated clay, bauxite and synthetically prepared alumina and silica composition.

In the operation of the apparatus a pressure exceeding atmospheric is maintained within the reaction chamber. The pressure maintained may, for example, be fifty pounds gauge. The reactivation of the catalyst may, on the other hand, be performed at atmospheric pressure within the chamber 11. A continuously descending packed mass of catalyst is maintained within the reaction chamber and within the reactivation chamber. An indicating device 50 at the upper end of each chamber indicates the level of the catalyst therein. Within the reaction chamber the descending mass of catalyst passes countercurrent to the stream of reactants introduced through the line 14. Within a relatively low region of the chamber the catalyst passes gradually downwardly through suitable retarding means, not shown, and then falls freely into the liquid bath at the lower end of the chamber extension 18. The pump 28 continuously withdraws the liquid and the catalyst so received from the bath through the pipe 27 and forces the mixture through the pipe 29 to the separating drum 20. A tall column of the liquid is maintained within the column by the pump, and the height of the column is regulated by adjustment of the valve 41. From the separating drum the continuously delivered catalyst floats to the upper end of the column of liquid and there, by accumulation, forms a column of the catalyst reaching upwardly through the tapered portion of column 19 to the juncture of the conduit 21 therewith. At said juncture the catalyst continuously spills into the discharge conduit 21 and is delivered by the latter into the upper end of the reactivation chamber 11. Continuous reciprocation of the tapered portion of the conduit by the device 25 prevents arching of the catalyst within the conduit and facilitates upward passage of the catalyst therethrough. The entire course of the catalyst from the reaction chamber to the reactivation chamber is gas-tight, and the liquid forms a gas seal extending from the lower end of chamber extension 18 to the upper end of the said column of liquid so that gas leakage and gas exchange between the chambers is effectually prevented along said course.

The liquid, freed from the catalyst by flotation of the latter, is continuously withdrawn from the bottom of the separating drum and passed back to the bath 26 through the pipe 30, the valve casing 31 and the pipe 32. Such return passage of the liquid is automatically controlled by the float-operated valve 33 to maintain a required depth of the liquid bath 26 at the lower end of the chamber extension. The bath is preferably maintained relatively shallow at that point and at a level far below that of the liquid column in the conduit. The level of the bath is predetermined by the location of the float 34.

The valve 41 in the liquid delivery line 29 is adjusted for maintenance of the column of liquid within the conduit 19 at a height sufficient to provide a hydrostatic head adequate to balance the pressure differential between the chambers 10 and 11 and sufficient also to sustain the said column of catalyst by flotation.

Within the reactivation chamber 11 the catalyst gradually and continuously passes downwardly through suitable retarding means, not shown, and falls into the bath 26'. Thence the catalyst is continuously passed to the separating drum 20' by circulation of the liquid through the pipes 27' and 29' by the pump 28'. From the drum, the catalyst continuously floats to the top of a column of the liquid maintained by the pump at a level determined by adjustment of the valve 41'. The catalyst accumulates upon the column of liquid and itself forms a column reaching to the level of the juncture of the conduit 21' and the conduit 19'. There the catalyst continuously spills into the conduit 21' and is passed thereby into the reaction chamber 10, thus completing the catalyst transfer cycle. The course of the catalyst from the bath 26' to the chamber 10 is gas-tight and the liquid seal prevents passage of gas from the high pressure chamber 10 to the low pressure chamber 11 so that gas leakage and gas exchange between the chambers is effectually prevented. The liquid, as it is freed from the catalyst within the separating drum, passes continuously from the bottom of the drum back to the bath 26' through the pipe 30', the valve casing 31' and the pipe 32'. The float-controlled valve 33' regulates the rate of such return of the liquid to the bath and thereby regulates the depth of the bath.

When the pump in either of the said sealing and catalyst transferring systems ceases to operate, the check valve at the discharge end of the delivery pipe leading to the separating drum will be closed by flotation within the liquid in the drum. Thereby reverse flow of the catalyst to the pump and consequent clogging of the latter is prevented by the screen of the check valve. At the same time, the liquid can flow back through the screen and reach an equalization level within the conduit 19 and the vertical tubes 35, 40, 43, and 44.

In the operation of the sealing and catalyst transferring systems the bodies of sealing liquid will receive much heat from the reaction zone and the reactivation zone. Additional heat required to keep the sealing metal in a molten condition may be supplied from additional sources, not shown.

The invention greatly simplifies the mechanism for elevation and transfer of catalyst along a relatively long course between a reaction zone and a reactivation zone or other zone and also provides for effectual maintenance of a desired difference in gaseous conditions between the zones by employment of the same means employed to effect the transfer of the catalyst.

While our invention is disclosed as employed in connection with a catalytic reaction and reactivation process, features of the invention may be employed very advantageously in connection with other contact processes such as gas adsorption processes, for example. Therefore, the invention is not limited strictly to the present disclosure but comprehends such adaptations and modifications as will lie within the scope of the appended claims.

Having thus fully described our invention, what we claim as new and desire to secure by Letters Patent is:

1. A device for elevating a solid material in a divided state, comprising an upstanding conduit, means to deliver liquid together with said material into said conduit at a low point of the latter, an expansion joint between an upper length portion of the conduit and a lower length portion thereof, the conduit having an outlet for said material at a point spaced substantially above said expansion joint, and a vibrator device associated with said upper length portion of the conduit and external thereto and operable to reciprocate same vertically relatively to the lower length portion to facilitate upward passage of said material within the conduit.

2. In a contact process wherein solid contact material in a divided state is passed downwardly within a zone to a low point of the latter and is elevated from said point to a relatively high level above said point for delivery to another zone, and in which process said zones are required to be maintained under different gaseous conditions, the improvement in such transfer of the contact material from zone to zone, with prevention of gas exchange between the zones, comprising passing the contact material from said low point of one of said zones into a body of sealing liquid non-wetting and non-reactive with respect to said material and heavier than the latter, forming and maintaining a column of said liquid extending upwardly from the level of said low point, passing from said body to said column a stream of the liquid containing the received material, elevating the material to the top of the column by flotation, constraining the material so elevated to form a column thereof sustained by the column of liquid and reaching to said high level, passing the contact material from the upper end of the column thereof into the other of said zones, passing a return stream of the liquid from said column thereof to said body, and regulating the delivery of the liquid by said return stream to maintain a predetermined level of the liquid of said body at said low point.

3. In a contact process wherein solid contact material in a divided state is passed downwardly within a zone to a low point of the latter and is elevated from said point to a relatively high level above said point for delivery to another zone, and in which process said zones are required to be maintained under different gaseous conditions, the improvement in such transfer of the contact material from zone to zone, with prevention of gas exchange between the zones, comprising passing the contact material from said low point of one of said zones into a body of sealing liquid non-wetting and non-reactive with respect to said material and heavier than the latter, forming and maintaining a column of said liquid extending upwardly from the level of said low point, passing from said body to said column a stream of the liquid containing the received material, elevating the material to the top of the column by flotation, passing the contact material so elevated into the other of said zones, passing a return stream of the liquid from said column thereof to said body, and regulating the delivery of the liquid by said return stream to maintain a predetermined level of the liquid of said body at said low point.

4. In a continuous contact process wherein solid contact material in a divided state is continuously passed downwardly within a zone to a low point of the latter and is elevated from said point to a relatively high level above said point for delivery to another zone, and in which process said zones are required to be maintained under different gaseous conditions, the improvement in such transfer of the contact material from zone to zone, with prevention of gas exchange between the zones, comprising maintaining at said low point a body of sealing liquid non-wetting and non-reactive with respect to said material and heavier than the latter, continuously discharging the contact material from the first-mentioned zone into said body of liquid, forming and maintaining a column of said liquid extending upwardly from the level of said low point, continuously passing from said body to the lower portion of said column a stream of the liquid containing the received material, elevating the material to the top of the column by flotation, constraining the material so elevated to form a column thereof sustained by the column of liquid and reaching to said high level, passing the contact material from the upper end of said column thereof into the other of said zones, continuously passing a return stream of the liquid from said column thereof to said body, and regulating the delivery of the liquid by said return stream to maintain a predetermined level of the liquid of said body at said low point.

5. In a contact process wherein solid contact material in a divided state is passed downwardly within a low pressure zone to a low point of the latter and is elevated from said point to a relatively high level above said point for delivery to a zone of higher pressure, the improvement in such transfer of the contact material from zone to zone, with maintenance of a required pressure differential between the zones, comprising passing the contact material from said low point of the low pressure zone into a body of sealing liquid non-wetting and non-reactive with respect to said material and heavier than the latter, forming and maintaining a column of said liquid extending upwardly from a point which is a substantial distance below the level of said low point, passing from said body to a point in said column which is a substantial distance below said low point of the low pressure zone, a stream of the liquid containing the received material for elevation of the material to the top of the column by flotation, constraining the material so elevated to form a column thereof sustained by the column of liquid and reaching to said high level, passing the contact material from the upper end of the column thereof into the high pressure zone, excluding external atmosphere from the contact material in the passage thereof from the liquid column to the high pressure zone, passing a return stream of the liquid from said column thereof to said body, and regulating the delivery of the liquid by said return stream to maintain a predetermined level of the liquid of said body at said low point.

6. In a catalytic reaction process wherein a catalyst of solid material in a divided state is passed downwardly through a reaction zone to a low point of the latter, elevated to a relatively high level above said point, passed to a catalyst reactivation zone for downward passage therethrough to a low point and elevated and returned to the reaction zone for re-use, the improvement in each of said catalyst transfers between said zones, with prevention of gas exchange between the zones, comprising passing the catalyst from the low point of one of the zones into a body of sealing liquid non-wetting and non-reactive with respect to the catalyst and heavier than the latter, forming of said liquid a column extending upwardly from the level of said low point of the respective zone, passing from said body to said column a stream of the liquid containing the received catalyst for elevation of the catalyst by flotation to the top of the column, constraining the catalyst so elevated to form a column thereof sustained by the column of liquid and reaching to the said high level, passing the catalyst from the upper end of the column thereof into the other of said zones, passing a return stream of the liquid from said column thereof to said body, and regulating the delivery of the liquid by said return stream to maintain a predetermined level of the liquid of said body at said low point.

7. In a contacting apparatus in which a solid contact material in a divided state passes downwardly and then leaves said apparatus through a liquid seal, the combination comprising a chamber, a standpipe of smaller cross-section than the chamber and communicating with the bottom of said chamber, a second standpipe extending upwardly along said chamber to a relatively high level above the first-named standpipe, a conduit connection between the lower portions of said standpipes, pump means associated with said conduit connection, an outlet at the top portion of the second-named standpipe, a second conduit connection between the lower portions of the standpipes, and valve means associated with said second conduit connection operated by and controlling the flow through said connection so as to maintain liquid in the first-named standpipe at a predetermined level.

8. In an apparatus in which a solid contact material in a divided state passes downwardly through an enclosed zone and then leaves said zone through a liquid seal, the combination comprising a chamber defining said zone, a standpipe extending upwardly along said chamber to a relatively high level above the bottom of the chamber and having an outlet at said level, a delivery conduit connection between the lower portion of said chamber and the lower portion of said standpipe, said lower portion of the chamber, communicating with said conduit connection, being substantially reduced in horizontal cross section, pump means associated with said conduit connection, a return conduit connection between the lower end portion of said standpipe and the lower portion of said chamber, and a valve mechanism associated with said return conduit connection and responsive to delivery of liquid through said return connection to the chamber to control such delivery and maintain liquid in the lower portion of the chamber at a predetermined level.

9. In an apparatus in which a solid contact material in a divided state passes downwardly through an enclosed zone and then leaves said zone through a liquid seal, the combination comprising a chamber defining said zone, a standpipe extending upwardly along said chamber to a relatively high level above the bottom of the chamber and having an outlet at said level, a delivery conduit connection between the lower portion of said chamber and the lower portion of said standpipe, said lower portion of the chamber, communicating with said conduit connection, being substantially reduced in horizontal cross section, pump means associated with said conduit connection, a return conduit connection between the lower end portion of said standpipe and the lower portion of said chamber, a valve mechanism associated with said return conduit connection and responsive to delivery of liquid through said return connection to the chamber to control such delivery and maintain liquid in the lower portion of the chamber at a predetermined level, and a vibrating device associated with the upper portion of said standpipe and operable to vibrate same.

10. In an apparatus in which a solid contact material in a divided state passes downwardly through an enclosed zone and then leaves said zone through a liquid seal, the combination comprising a chamber defining said zone, a standpipe extending upwardly along said chamber to a relatively high level above the bottom of the chamber and having an outlet at said level, a delivery conduit connection between the lower portion of said chamber and the lower portion of said standpipe, said lower portion of the chamber, communicating with said conduit connection being substantially reduced in horizontal cross section, pump means associated with said conduit connection, a return conduit connection between the lower end portion of said standpipe and the lower portion of said chamber, a valve mechanism associated with said return conduit connection and responsive to delivery of liquid through said return connection to the chamber to control such delivery and maintain liquid in the lower portion of the chamber at a predetermined level, a substantial upper length of said standpipe being upwardly flared, and a vibrator device associated with the flared portion of the conduit and operable to vibrate same.

11. In an apparatus in which a solid contact material in a divided state passes downwardly through an enclosed zone and then leaves said zone through a liquid seal, the combination comprising a chamber defining said zone, a standpipe extending upwardly along said chamber to a relatively high level above the bottom of the chamber, and having an outlet at said level, a delivery conduit connection between the lower portion of said chamber and the lower portion of said standpipe, said lower portion of the chamber, communicating with said conduit connection being substantially reduced in horizontal cross section, pump means associated with said conduit connection, a return conduit connection between the lower end portion of said standpipe and the lower portion of said chamber, a valve mechanism associated with said return conduit connection and responsive to delivery of liquid through said return connection to the chamber to control such delivery and maintain liquid in the lower portion of the chamber at a predetermined level, an expansion joint between an upper length of the conduit and a lower length thereof, and a vibrator device associated with said upper length of the standpipe and operable to vibrate same.

12. In an apparatus in which a solid contact material in a divided state passes downwardly through an enclosed relatively low pressure zone and leaves said zone through a liquid seal, the combination comprising a chamber defining said zone, a standpipe extending upwardly along said chamber from a point substantially below the level of the bottom of the chamber to a relatively high level above the bottom of the chamber, a delivery conduit connection between the lower portion of said chamber and the lower portion of said standpipe, said lower portion of the chamber, communicating with said conduit connection, being substantially reduced in horizontal cross section, pump means associated with said conduit connection, a return conduit connection between the lower end portion of said standpipe and the lower portion of said chamber, a valve mechanism associated with said return conduit and responsive to delivery of liquid through said return connection to the chamber to control such delivery and maintain liquid in the lower portion of the chamber at a predetermined level, a relatively high pressure chamber, and a delivery connection between the upper portion of said standpipe and said high pressure chamber to pass to the latter the contact material.

13. In a catalytic reaction apparatus in which a solid catalyst in a divided state passes downwardly through an enclosed zone and leaves said zone through a liquid seal, the combination of a chamber defining the reaction zone, a chamber defining a catalyst regeneration zone, catalyst transfer connections leading respectively from a low point of the reaction chamber to a high point of the regeneration chamber and from a low point of the regeneration chamber to a high point of the reaction chamber, each of said transfer connections comprising a standpipe extending upwardly along one of said chambers to a relatively high level above the bottom of the chamber, a delivery conduit connection between the lower portion of said chamber and the lower portion of said standpipe, said lower portion of the chamber, communicating with said conduit connection, being substantially reduced in horizontal cross section, pump means associated with said conduit connection, a return conduit connection between the lower end portion of said standpipe and the lower portion of said chamber, a valve mechanism associated with said return conduit connection and responsive to delivery of liquid through said return conduit connection to said chamber to control such delivery and maintain liquid in the lower portion of the chamber at a predetermined level, and a catalyst delivery connection between the upper portion of said standpipe and the other one of said chambers.

14. In an apparatus for conveying a solid material in a divided state by means of a liquid between zones which are required to be maintained under different gaseous conditions, a receptacle, a conduit in delivery connection with said receptacle, pump means associated with said conduit, and a leaf check valve associated with said conduit within said receptacle, said leaf check valve comprising a hinged screen structure arranged to freely swing downwardly and of such weight as to swing upwardly when unopposed by flow from said pump through said conduit by the flotation effect of the liquid in said receptacle.

CARL S. REED.
AUGUST HENRY SCHUTTE.
VERNON O. BOWLES.

REFERENCES CITED

The following references are of record in the file of this patent:

UNITED STATES PATENTS

| Number | Name | Date |
|---|---|---|
| 2,238,792 | Hanawalt et al. | Apr. 15, 1941 |
| 2,268,535 | Schutte | Dec. 30, 1941 |
| 2,331,938 | Schutte | Oct. 19, 1943 |
| 2,360,787 | Murphree et al. | Oct. 17, 1944 |